(12) United States Patent
Curtis et al.

(10) Patent No.: US 8,660,813 B2
(45) Date of Patent: Feb. 25, 2014

(54) METHOD AND SYSTEM FOR DISAGGREGATING HEATING AND COOLING ENERGY USE FROM OTHER BUILDING ENERGY USE

(75) Inventors: Richard Curtis, Arlington, VA (US); David Copeland, Washington, DC (US); Daniel J. Yates, Washington, DC (US)

(73) Assignee: OPOWER, Inc., Arlington, VA (US)

( * ) Notice: Subject to any disclaimer, the term of this patent is extended or adjusted under 35 U.S.C. 154(b) by 440 days.

(21) Appl. No.: 12/940,447

(22) Filed: Nov. 5, 2010

(65) Prior Publication Data

US 2011/0106471 A1     May 5, 2011

Related U.S. Application Data

(60) Provisional application No. 61/258,373, filed on Nov. 5, 2009.

(51) Int. Cl.
    *G01R 21/00*      (2006.01)
    *G01K 11/00*      (2006.01)
    *G06F 11/30*      (2006.01)
    *G05D 23/00*      (2006.01)

(52) U.S. Cl.
    USPC ............. 702/130; 702/60; 702/182; 700/299

(58) Field of Classification Search
    USPC ............. 702/60, 61, 62, 130, 136, 179, 182, 702/187, 188; 700/276, 277, 299, 300
    See application file for complete search history.

(56) References Cited

U.S. PATENT DOCUMENTS 4,843,575 A    6/1989   Crane ........................... 364/550

(Continued)

FOREIGN PATENT DOCUMENTS

| DE | 3703387 | 8/1987 | ............. G01K 17/08 |
| JP | 2007133468 | 5/2007 | ............. G06Q 50/00 |

OTHER PUBLICATIONS

Margaret F. Fels, *PRISM: An Introduction*, Elsevier Sequoia, Energy and Buildings, vol. 9, pp. 5-18 (1986).

Margaret F. Fels, et al., *Seasonality of Non-heating Consumption and Its effect on PRISM Results*, Elsevier Sequoia, Energy and Buildings, vol. 9, pp. 139-148 (1986).

(Continued)

*Primary Examiner* — Marc Armand
*Assistant Examiner* — Ricky Ngon
(74) *Attorney, Agent, or Firm* — Sunstein Kann Murphy & Timbers LLP

(57) ABSTRACT

Illustrative embodiments of the present invention are directed to a method and system for disaggregating climate control energy use from non-climate control energy use for a building. The method includes receiving a series of building energy use values and corresponding outdoor temperature values for a time period. Each of the energy use values and outdoor temperature values is associated with a time interval. The method further includes determining a series of temperature difference values for the time period based on a difference in temperature between a predetermined baseline temperature and each of the outdoor temperature values. A regression analysis is used to determine a climate control coefficient and a non-climate control coefficient from the energy use values and temperature difference values. The climate control coefficient and/or the non-climate control coefficient is used to determine climate control energy use and/or non-climate control energy use for the building.

22 Claims, 7 Drawing Sheets

(56) References Cited

U.S. PATENT DOCUMENTS

| | | | | |
|---|---|---|---|---|
| 5,513,519 | A | 5/1996 | Cauger et al. | 73/112 |
| 5,566,084 | A | 10/1996 | Cmar | 364/492 |
| 5,717,609 | A | 2/1998 | Packa et al. | 364/557 |
| 5,873,251 | A | 2/1999 | Iino | 60/660 |
| 6,785,620 | B2 | 8/2004 | Kishlock et al. | 702/61 |
| 7,200,468 | B2 | 4/2007 | Ruhnke et al. | 700/300 |
| 7,243,044 | B2 * | 7/2007 | McCalla | 702/182 |
| 8,065,098 | B2 * | 11/2011 | Gautam | 702/62 |
| 2008/0027885 | A1 | 1/2008 | van Putten et al. | 705/412 |
| 2008/0281763 | A1 | 11/2008 | Yliniemi | 705/412 |
| 2012/0084063 | A1 * | 4/2012 | Drees et al. | 703/6 |

OTHER PUBLICATIONS

Miriam I. Goldberg et al., *Refraction of PRISM Results into Components of Saved Energy*, Elsevier Sequoia, Energy and Buildings, vol. 9, pp. 169-180 (1986).

International Searching Authority, International Search Report—International Application No. PCT/US2010/055621, dated Dec. 23, 2010, together with the Written Opinion of the International Searching Authority, 10 pages.

The International Bureau of WIPO International Preliminary Report on Patentability and the Written Opinion for International Application No. PCT/US2010/055621, 8 pages, May 18, 2012.

\* cited by examiner

METHOD AND SYSTEM FOR DISAGGREGATING HEATING AND COOLING ENERGY USE FROM OTHER BUILDING ENERGY USE

PRIORITY

The present application claims the benefit of U.S. Application Ser. No. 61/258,373, filed Nov. 5, 2009, which application is incorporated herein, in its entirety, by reference.

TECHNICAL FIELD

The present invention relates to energy use, and more particularly to building energy use.

BACKGROUND ART

The bulk of residential energy consumption is devoted to space heating and cooling. Unlike other end uses, households typically have direct control over the amount of heating or cooling used in their home. Unfortunately, energy consumption is typically reported as a "lump sum" rather than being allocated to specific devices or end uses. Even advanced metering systems that record energy use by day, hour, or even minute, only report the aggregate usage for each household.

SUMMARY OF THE INVENTION

Illustrative embodiments of the present invention are directed to a computerized-method for disaggregating climate control energy use from non-climate control energy use for a building. The method includes receiving a series of building energy use values and corresponding outdoor temperature values for a time period. Each of the energy use values and outdoor temperature values is associated with a time interval. A series of temperature difference values is determined for the time period. The series is determined based on a difference in temperature between a predetermined baseline temperature and each of the outdoor temperature values. Then, a regression analysis is used to determine a climate control coefficient and a non-climate control coefficient from the energy use values and temperature difference value. The method further includes using the climate control coefficient and the non-climate control coefficient to determine climate control energy use and non-climate control energy use for the building. The climate control energy use and non-climate control energy use for the building are then communicated to a customer associated with the building (e.g., tenant).

In one embodiment of the present invention, determining a climate control coefficient includes determining a cooling coefficient. The cooling coefficient is determined based on the energy use values that are associated with outdoor temperature values above the baseline temperature. Also, in such an embodiment, determining the climate control energy use for the building includes using the non-climate control coefficient and the cooling coefficient to determine cooling energy use for the building.

Illustrative embodiments of the invention that determine a cooling coefficient may also include receiving a second series of building energy use values and corresponding outdoor temperature values for a second time period. Each of the energy use values and outdoor temperature values is associated with a time interval. A series of cooling degree values for the time period is determined based on a difference in temperature between the predetermined baseline temperature and each of the outdoor temperature values above the baseline temperature. The cooling degree values for the second time period are summed to determine a cooling sum value. The non-climate control coefficient is multiplied by the number of time intervals in the second time period to determine a non-climate control value. Also, the cooling coefficient is multiplied by the cooling sum value. The product of the cooling coefficient and the cooling sum value are added to the non-climate control value to determine a normalizer value. Then, the product of the cooling coefficient and the cooling sum value is divided by the normalizer value to determine a cooling energy use percentage for the building.

In another embodiment of the present invention, determining a climate control coefficient includes determining a heating coefficient. Such an embodiment includes determining a heating coefficient based on the energy use values that are associated with outdoor temperature values below the baseline temperature. Also, determining a climate control energy use for the building includes using the non-climate control coefficient and the heating coefficient to determine heating energy use for the building.

Illustrative embodiments of the invention that determine heating coefficients may also include receiving a second series of building energy use values and corresponding outdoor temperature values for a second time period. Each of the energy use values and outdoor temperature values is associated with a time interval. A series of heating degree values for the time period based on a difference in temperature between the predetermined baseline temperature and each of the outdoor temperature values below the baseline temperature. The heating degree values for the second time period are summed to determine a heating sum value. The non-climate control coefficient is multiplied by the number of time intervals in the second time period to determine a non-climate control value. Also, the heating coefficient is multiplied by the heating sum value. The product of the heating coefficient and the heating sum value are added to the non-climate control value to determine a normalizer value. Then, the product of the heating coefficient and the heating sum value is divided by the normalizer value to determine a heating energy use percentage for the building.

In yet another embodiment of the present invention, determining a climate control coefficient includes determining both a heating coefficient and a cooling coefficient. In such an embodiment, determining the climate control coefficient includes determining the cooling coefficient based on the energy use values that are associated with outdoor temperature values above the predetermined baseline temperature and determining the heating coefficient based on the energy use values that are associated with outdoor temperature values below the baseline temperature. Also, determining climate control energy use for the building includes using the non-climate control coefficient, the cooling coefficient, and the heating coefficient to determine cooling energy use and heating energy use for the building.

Illustrative embodiments of the invention that determine both heating and cooling coefficients may further include receiving a second series of building energy use values and corresponding outdoor temperature values for a second time period. Each of the energy use values and outdoor temperature values is associated with a time interval. A series of cooling degree values for the time period is determined based on a difference in temperature between the predetermined baseline temperature and each of the outdoor temperature values above the baseline temperature. Also, a series of heating degree values for the time period is determined based on a difference in temperature between the predetermined baseline temperature and each of the outdoor temperature values below the baseline temperature. The method further includes summing the cooling degree values for the second time period to determine a cooling sum value and summing the heating degree values for the second time period to determine a heating sum value. The non-climate control coefficient is multiplied by the number of time intervals in the second time period to determine a non-climate control value. The following values are summed to determine a normalizer value: (1) the non-climate control value, (2) the product of the cooling coefficient and the cooling sum value, and (3) the product of the heating coefficient and the heating sum value. Then, the product of the cooling coefficient and the cooling sum value is divided by the normalizer value to determine a cooling energy use percentage for the building. Also, the product of the heating coefficient and the heating sum value is divided by the normalizer value to determine a heating energy use percentage for the building.

In some embodiments, the predetermined baseline temperature has a value between 55° F. and 75° F. In more specific illustrative embodiments, the predetermined baseline temperature is 65° F.

Furthermore, in some or all of the above described embodiments, the regression analysis is an ordinary least squares regression analysis. In some cases, the time interval may be one hour, one day, or one month. Also, in specific exemplary embodiment, the time interval is one day and the series of building energy use values and outdoor temperature values for the time period, may include at least 270 energy use values and 270 corresponding outdoor temperature values. Furthermore, in some exemplary embodiments, the building energy use values include both electricity and natural gas energy use values.

In illustrative embodiments, the method is performed for each of a plurality of buildings. Such a method may include receiving, for each one of a plurality of buildings, a series of building energy use values and corresponding outdoor temperature values for a time period. Each of the energy use values and outdoor temperature values is associated with a time interval. For each one of the plurality of buildings, a series of climate control values for the time period is determined based on a difference in temperature between a predetermined baseline temperature and each of the outdoor temperature values. Also, for each one of the plurality of buildings, a regression analysis is used to determine a non-climate control coefficient and a climate control coefficient from the energy use values and climate control values. The method further includes using the non-climate control coefficient for each building and the climate control coefficient for each building to determine climate control energy use for each of the plurality of buildings.

Illustrative embodiments of the present invention are directed to a system for disaggregating climate control energy use from non-climate control energy use for a building. The system includes a processor and a memory storing instructions executable by the processor to perform processes. The processes include any of the methods described above. In one illustrative embodiment, the system includes a plurality of modules such as:

A utility communication module for receiving a series of building energy use values.

A weather communication module for receiving outdoor temperature values.

A matching module for matching energy use values to corresponding outdoor temperatures values, wherein each of the energy use values and outdoor temperature values is associated with a time interval.

A subtraction module for determining a series of temperature difference values for the time period based on a difference in temperature between a predetermined baseline temperature and each of the outdoor temperature values.

A regression module for determining at least one of climate control coefficient and a non-climate control coefficient from the energy use values and temperature difference values.

A disaggregation module for determining at least one of climate control energy use and non-climate control energy use for the building, using at least one of the climate control coefficient and the non-climate control coefficient.

A customer communication module for communicating at least one of climate control energy use and non-climate control energy use for the building to an associated customer.

Illustrative embodiments of the present invention are also directed to at least one non-transitory computer readable medium encoded with instructions which when loaded on at least one computer, establish processes for disaggregating climate control energy use from non-climate control energy use for a building. The processes include any of the methods described above.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The term "climate control" is inclusive of any type of activity that conditions the air in a building (e.g., cooling or heating).

Accordingly, the term "climate control energy use" is inclusive of any energy used to condition the air in the building. Such energy use includes, for example, the natural gas used to power a furnace and/or the electricity used to power a heating, ventilating, and air conditioning system (HVAC).

The term "non-climate control" is inclusive of activities that do not condition the air in a building (e.g., lighting, entertainment, and food storage).

Accordingly, the term "non-climate control energy use" is inclusive of any energy that is not used to condition the air in the building. For example, non-climate control energy use includes electricity used to power the television, computer, or appliances (e.g., refrigerator, microwave, or stove).

The term "building" is inclusive of any residential or commercial building. Also, the term "building" is inclusive of single subsections or units within a larger building. For example, the term "building" is inclusive of a single apartment in a complex that includes dozens of other apartments or a single suite in a commercial space that includes a plurality of other suites.

Illustrative embodiments of the present invention are directed to methods and systems for disaggregating climate control energy use from non-climate control energy use. Various embodiments of the present invention use building energy use values and outdoor temperatures to determine climate control energy use and non-climate control energy use for a building. Those climate control energy use values and non-climate control energy use values are then communicated to a customer that is associated with the building (e.g., tenant, landlord, owner, or manager). In this manner, the associated customer can view an itemization of his climate control energy use and his non-climate control energy use, whereas, in many prior art systems, the energy use is reported to the customer as a "lump sum." Such an accounting of climate control energy use provides the customer with a more accurate report of costs and savings associated with climate control.

Figure 1:
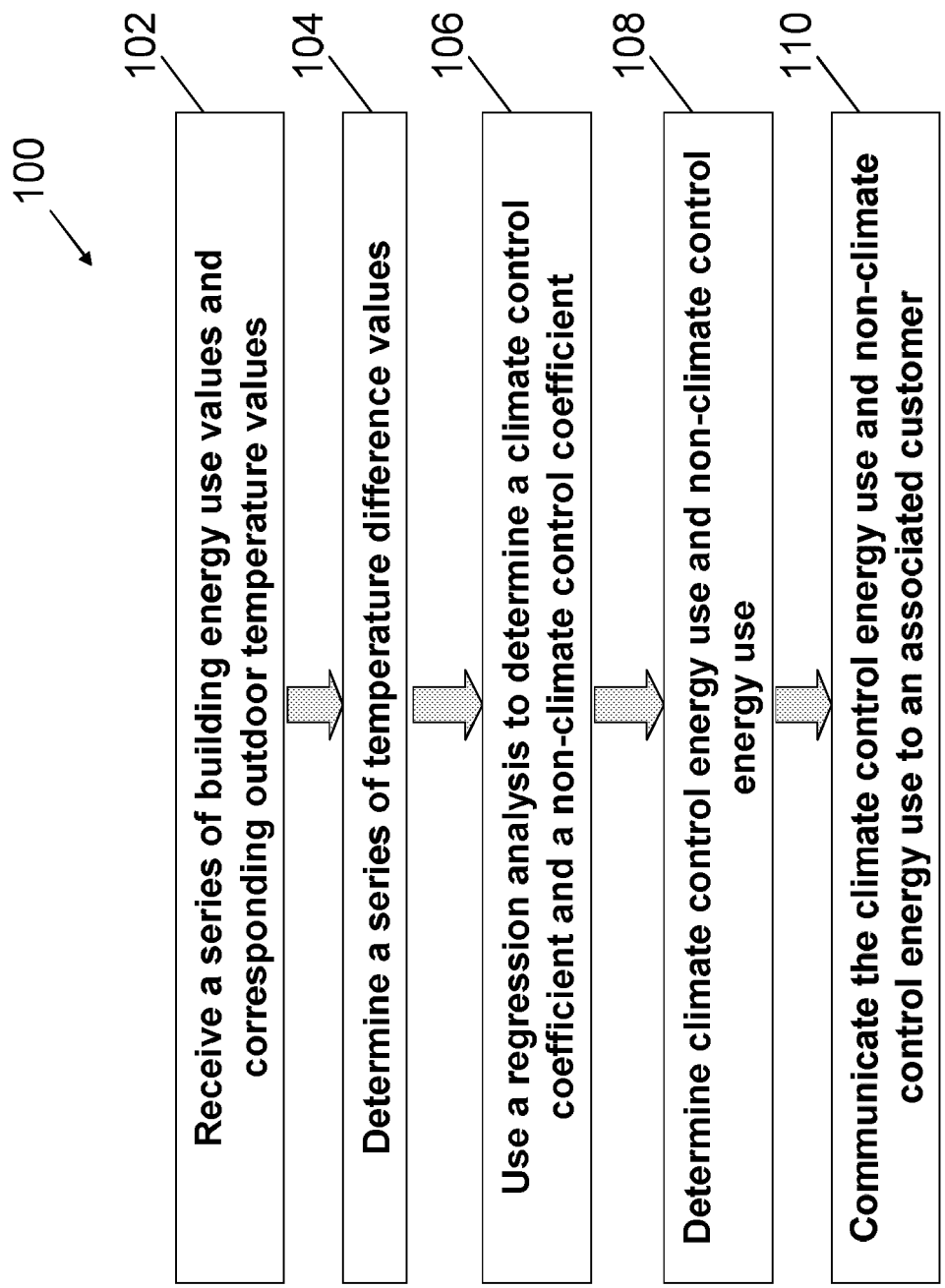
FIG. 1 shows a computerized method for disaggregating climate control energy use from non-climate control energy use, in accordance with one embodiment of the present invention.

FIG. 1. shows a computerized method 100 for disaggregating climate control energy use from non-climate control energy use, in accordance with one embodiment of the present invention. The methods starts by receiving a series of building energy use values and corresponding outdoor temperature values for a time period 102. Each of the energy use values and outdoor temperature values is associated with a time interval. Table I shows a series of energy use values for a particular building.

EXEMPLARY TABLE I

| Date | Energy Use Values |
|------|-------------------|
| 5/27 | 35 kwh |
| 5/28 | 44 kwh |
| 5/29 | 37 kwh |
| 5/30 | 34 kwh |
| 5/31 | 28 kwh |
| 6/1  | 30 kwh |
| 6/2  | 32 kwh |
| 6/3  | 31 kwh |
| 6/4  | 23 kwh |
| 6/5  | 40 kwh |

In Table I, the time period is the ten day period from May 27th to June 5th, however, in other embodiments of the present invention, the time period may be much longer (e.g., 1 month, 6 months, or 1 year). Also, in Table I, the time interval associated with the energy use values is one day. In other words, the table provides energy use values in a day-by-day format. In some embodiments of the present invention, however, the time interval may be much shorter. For example, energy use values may be received in an hour-by-hour or even minute-by-minute format. In other embodiments, the time interval may be much longer (e.g., a month-by-month format). Many prior art metering systems are only capable of providing month-by-month energy usages, but in the future, advanced metering systems may be able to provide day-by-day energy usages or hour-by-hour energy usages. Illustrative embodiments of the invention are capable of using each one of these energy reporting formats (e.g., month-by-month, day-by-day, hour-by-hour, 30 minute-by-30 minute, 15 minute-by-15 minute, or even minute-by-minute).

Table II shows a series of outdoor temperature values for the building. The outdoor temperatures correspond to the same time period as the energy use values.

EXEMPLARY TABLE II

| Date | Outdoor Temperature |
|------|---------------------|
| 5/27 | 61° F. |
| 5/28 | 55° F. |
| 5/29 | 58° F. |
| 5/30 | 63° F. |
| 5/31 | 65° F. |
| 6/1  | 71° F. |
| 6/2  | 72° F. |
| 6/3  | 69° F. |
| 6/4  | 69° F. |
| 6/5  | 75° F. |

In Table II, the time interval associated with the outdoor temperatures is one day (e.g., day-by-day format), but in other embodiments, the outdoor temperatures may be reported in a month-by-month, day-by-day, or hour-by hour format. In exemplary embodiments of the present invention, the outdoor temperatures are representative of the average outdoor temperature for the particular time interval (e.g., hour, day, or month). For example, in Table II, the outdoor temperature of 71° F. for June 1st may have been the average outdoor temperature for that day.

Once the series of building energy use values and corresponding outdoor temperature values is received, a series of temperature difference values for the time period is determined based on a difference in temperature between a baseline temperature and each of the outdoor temperature values 104. In some embodiments of the present invention, the baseline temperature is a predetermined temperature that is generally comfortable to humans (e.g., room temperature). Thus, in exemplary embodiments, the baseline temperature typically has a value between 55° F. and 75° F. However, a comfortable baseline temperature can vary based on geography (e.g., different for humid and dry climates). In the present example, the baseline temperature is 65° F. for both the cooling degree values and the heating degree values. However, in other embodiments, the baseline temperature for the cooling degree values and the heating degree values is different. For example, the baseline temperature for heating degree values may be 60° F. (heating baseline temperature) and the baseline temperature for cooling degree values may be 70° F. (cooling baseline temperature). Such a model assumes that moderate outdoor temperatures between 60° F. and 70° F. would not lead to heating or cooling energy usage.

Table III shows a series of temperature difference values for the time period derived from the first series of outdoor temperatures in Table II.

EXEMPLARY TABLE III

| Date | Cooling Degree Values | Heating Degree Values |
| --- | --- | --- |
| 5/27 | 0 | 4° F. |
| 5/28 | 0 | 10° F. |
| 5/29 | 0 | 7° F. |
| 5/30 | 0 | 2° F. |
| 5/31 | 0 | 0 |
| 6/1 | 6° F. | 0 |
| 6/2 | 7° F. | 0 |
| 6/3 | 4° F. | 0 |
| 6/4 | 4° F. | 0 |
| 6/5 | 10° F. | 0 |

In illustrative embodiments of the invention, the series of temperature difference values includes cooling degree values and heating degree values. The cooling degree values are determined by subtracting the baseline temperature from outdoor temperatures that are above the baseline temperature, while the heating degree values are determined by subtracting outdoor temperatures, that are below the baseline temperature, from the baseline temperature. In the example of Table III, the baseline temperature is 65° F.; for the first four days each of the outdoor temperatures is below the baseline temperature, the fifth day has an outdoor temperature equal to the baseline temperature, and for the last five days each of the outdoor temperatures is above the baseline temperature (see Table II). Therefore, each of the first four days in the time period has a particular heating degree value, the fifth day has neither a heating degree or cooling degree value, and each of the final five days in the time period has a particular cooling degree value. Such a pattern is common in the Spring and Fall when a customer might switch between heating and cooling based on short-term temperature fluctuations. In the Summer, it is more likely for a customer to cool his building for several months before switching off their climate control. Similarly, in the Winter, it is more likely for a customer to heat his building for several months before switching off their climate control.

As explained above, the cooling degree values are determined by subtracting the baseline temperature from the outdoor temperatures that are above the baseline temperature, and the heating degree values are determined by subtracting the outdoor temperature from the baseline temperatures that are below the baseline temperature. For example, the cooling degree value for June 1st is determined by subtracting the baseline temperature (65° F.) from the outdoor temperature for that day (71° F.). Accordingly, the cooling degree value for June 1st is 6 degrees. In other words, on June 1st, a customer would need to cool his building by 6 degrees to achieve a comfortable baseline temperature. Similarly, the heating degree value for May 30th is determined by subtracting the outdoor temperature (63° F.) from the baseline temperature (65° F.). The heating degree value for May 30th is 2 degrees.

Figure 2:
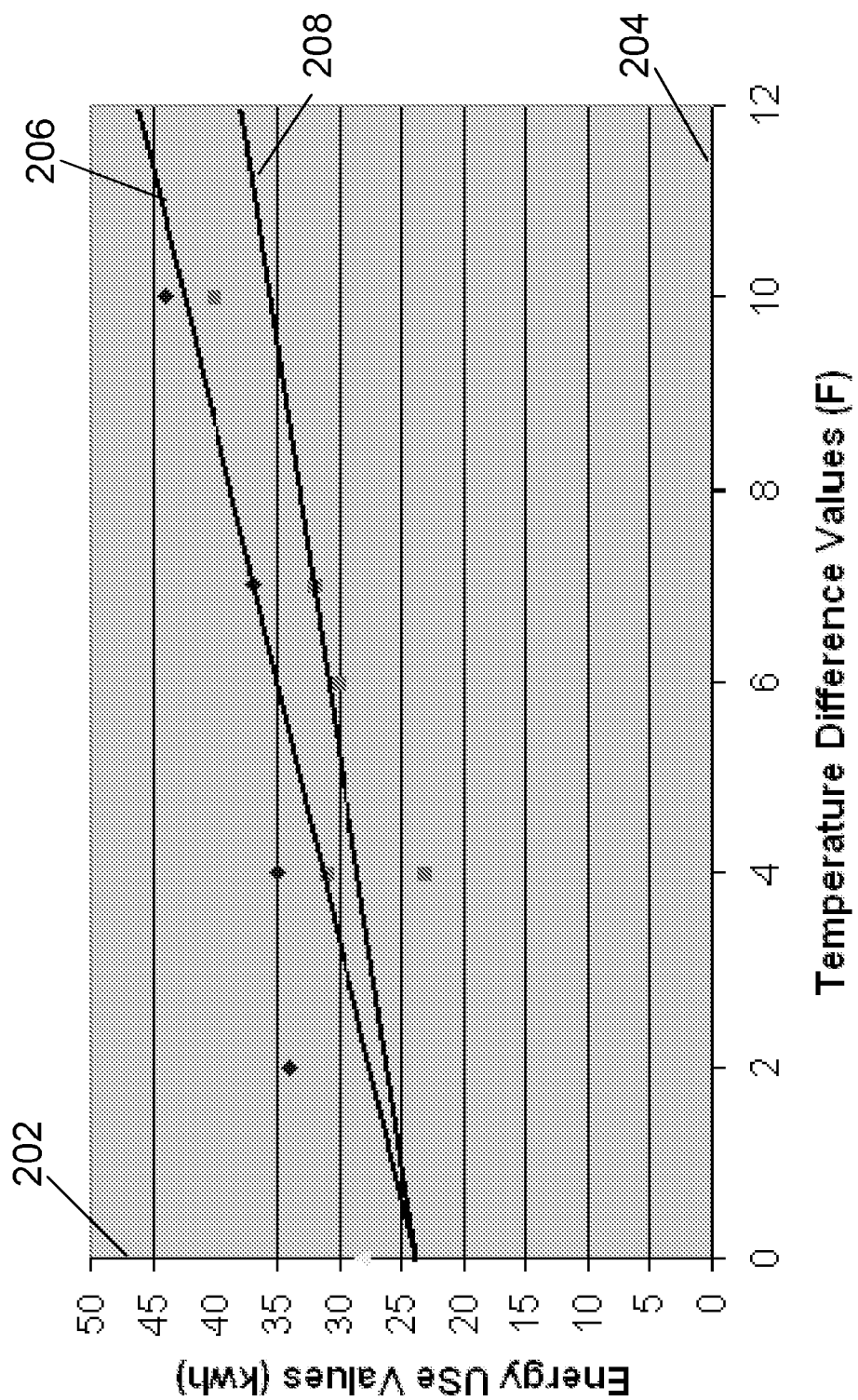
FIG. 2 shows an example of a regression analysis, in accordance with one embodiment of the present invention.

Once the temperature difference values (e.g., heating degree values and/or cooling degree values) are determined, the method uses a regression analysis to determine a non-climate control coefficient and a climate control coefficient from the energy use values and temperature difference values 106. FIG. 2 shows an example of a regression analysis, in accordance with one embodiment of the present invention. In the graph of FIG. 2, the energy use values from Table I are plotted against the temperature difference values from Table III. The energy use values appear on the vertical axis 202 and the temperature difference values appear on the horizontal axis 204. In the embodiment shown, a first line 206 and a second line 208 are generated using an ordinary least squares regression analysis. The equation for the first line 206 is: $y=1.984x+24$ and the equation for the second line 208 is: $y=1.274x+24$. The slopes of the first line 206 and the second line 208 are representative of the climate control coefficients. The slope of the first line 206 is the heating coefficient (1.984 kwh/degree), the slope of the second line is the cooling coefficient (1.274 kwh/degree), and the intercept of both lines at the vertical axis 202 is the non-climate control coefficient (24 kwh/day). In the present example, the climate control coefficient includes both a cooling coefficient and a heating coefficient. In other examples, however, the climate control coefficient may include only a heating coefficient or only a cooling coefficient. For example, in some cases, there may only be a cooling coefficient because there are no heating degree values. In such a case, the heating coefficient would have a value of "0."

In various exemplary embodiments, a different regression analysis may be used (e.g., other linear regression analysis methods and/or non-linear regression analysis methods). For example, in some embodiments, a hierarchical (or multilevel) regression analysis is performed. In additional or alternative embodiments, higher order polynomials for heating and cooling degree values could also be used. In exemplary embodiments, the use of higher order polynomials for heating and cooling degree values enables the regression to detect a varying relationship between the energy use values and the temperature difference values (e.g., changes in the slope of lines 206 and 208).

Furthermore, in other exemplary embodiments, additional variables may be included in the regression analysis (e.g., day-of-the-week dummy variables, day-light hour dummy variables, and humidity dummy variables). A dummy variable, or indicator variable, is a numerical variable used in regression analysis to represent subgroups of the sample in the regression. In illustrative embodiments of the present invention using a day-of-the-week dummy variables, weekend days are coded with a "1" (Saturday and Sunday), while weekdays are coded with a "0" (Monday through Friday). In this manner, weekend days and weekdays can be represented in a single regression equation.

In illustrative embodiments, using dummy variables results in a more accurate estimate of the building's heating and/or cooling coefficients. Also, in exemplary embodiments, the benefit of adding dummy variables to the regression analysis is that the dummy variables capture relationships that are omitted by an ordinary least squares regression analysis. This is particularly true if the building's heating and/or cooling coefficients are correlated with the dummy variables. For example, using an ordinary least squares analysis for a set of temperature and energy use values may produce the following coefficients in Table IV.

EXEMPLARY TABLE IV

| | Coefficients |
| --- | --- |
| Non-climate control | 30.000 kwh/day |
| Heating | 0.940 kwh/degree |
| Cooling | 1.400 kwh/degree |

In contrast, adding day-of-the-week dummy variables (as discussed above) to the regression analysis (and using the same set of temperature and energy use values) produces the following coefficients in Table V.

EXEMPLARY TABLE V

| | Coefficients |
|---|---|
| Non-climate control | 30.000 kwh/day |
| Heating | 0.820 kwh/degree |
| Cooling | 1.300 kwh/degree |
| Weekend | 2.75 kwh/day |

The weekend coefficient in Table V shows that, during weekend days, the building uses 2.75 kwh more per day than during the weekdays. Accordingly, the heating and cooling coefficients in Table V are lower because they account for the energy use difference between weekend days and weekdays. In Table IV, however, the regression analysis over-estimates the heating and cooling coefficients because the analysis omits the energy use difference between weekend days and weekdays. Accordingly, Table V contains more accurate estimations for the cooling coefficient and heating coefficient because the regression analysis accounts for a factor (e.g., weekends) that correlates with energy usage.

In additional or alternative embodiments, the regression analysis uses other dummy variables in the regression analysis. For example, in some illustrative embodiments, the regression analysis uses humidity dummy variables. In such an embodiment, days with humidity value greater than a particular percentage are coded with a "1" (e.g., greater than 80%), while days with lower humidity are coded with a "0". In another embodiment, if energy use data is reported in hourly time intervals, the regression analysis may use day-light hour dummy variables. In this embodiment, night-time hours are coded with a "1" (e.g., 9:01 PM through 7:59 AM), while day-light hours are coded with a "0" (e.g., 8:00 AM through 9:00 PM). Various other dummy variables may also be used in the regression analysis.

In further additional or alternative embodiments, night-time energy use can be used to confirm that the non-climate control coefficient (calculated through the regression analysis) is reasonable. For example, if energy use data is reported in hourly time intervals, night-time energy use between the hours of 1:00 AM and 5:00 AM can be used to confirm the accuracy of the non-climate control coefficient. Such a comparison assumes that the building is not cooled or heated during those night time hours.

In the present example, a predetermined baseline temperature is used to determine the coefficients. In other words, the predetermined temperature is not a variable during the regression analysis. In some embodiments of the present invention, the baseline temperature may not be predetermined, but is a variable during the linear regression analysis. However, in illustrative embodiments of the present invention, there are some benefits to using a predetermined baseline temperature. One benefit is that using a predetermined temperature is less computationally expensive than using a variable temperature. Using a variable temperature could become an issue when calculating the coefficients for a large number of buildings. There is a great deal of computational overheard involved when using a variable temperature (e.g., setting and checking thresholds, making sure the optimization actually finishes, etc.). Another problem with using a variable temperature is that the heating and cooling coefficient calculations become interdependent. Such a model must assume that the heating baseline temperature is lower than the cooling baseline temperature, otherwise the model would predict that the building uses both heating and cooling energy for certain "overlapping" temperatures. Therefore, to avoid such an aberrant result, the model would assume that the heating baseline temperature is lower than the cooling baseline temperature, but this additional constraint further complicates coefficient calculation.

Another benefit of using a predetermined temperature is that it is easier to explain changes in energy use to customers. With a predetermined temperature, changes in heating and cooling usage can be readily attributed to the customer or different outdoor temperatures (e.g., "You changed your energy use habits" or "It was hotter/colder in this time period"), whereas with a variable temperature, reporting a customer's energy use habits can be murkier. With a variable temperature, it is not as clear whether the customer's baseline energy use is changing because of the variable temperature or because of the customer's energy use habits.

Furthermore, using a predetermined baseline temperature to determine coefficients is advantageous because it allows the coefficients to be specific to a particular customer. For example, the customer can report the temperature at which they turn-on their heat and the temperature at which they turn-on air-conditioning (e.g., thermostat settings). These customer specific temperatures can then be used to calculate the climate control coefficient, cooling coefficient, and/or heating coefficient for their building. The customer can report their baseline temperatures via a website on the internet or, in other cases, the temperatures can be determined using a phone survey. In further exemplary embodiments, the thermostat settings can be obtained directly from the thermostat (e.g., using a two-way communicating thermostat).

In illustrative embodiments of the present invention, the non-climate control coefficient is representative of the non-climate control energy usage for the building (e.g., energy used for entertainment, cooking, and lighting). In the example of FIG. 2, the non-climate control coefficient for the building is 24 kwh/day. This means that, when the building is not being heated or cooled, the building uses an average of 24 kwh of electricity per day for activities that are unrelated to climate control and outside temperature change. On the other hand, the cooling coefficient and heating coefficient are representative of the building's sensitivity to changes in outside temperature. In other words, the cooling coefficient and heating coefficient model the amount of energy necessary to cool or heat the building given a particular outdoor temperature.

In exemplary embodiments of the present invention, the non-climate control coefficient, cooling coefficient, and heating coefficient are building specific and, therefore, are calculated separately for each building. This is so because one building's sensitivity to outdoor temperature may be less than another's. For example, one household may have an efficient HVAC system with well insulated walls and windows, whereas another household may have an outdated cooling and heating system with poorly insulated walls and windows. Furthermore, one building's non-climate control energy use may be different than another building's non-climate control energy use. For example, one household may leave appliances on for the entire day, whereas another household may be more diligent in turning appliances off when not in use.

For the sake of clarity and simplicity, in the present example, the non-climate control coefficient, cooling coefficient, and heating coefficient were calculated using a data set with only 10 data points (e.g., 10 energy use values and 10 corresponding outdoor temperatures), however, other exemplary embodiments of the present invention rely on many more data points. To obtain more accurate coefficients, exemplary embodiments rely on at least 270 data points (e.g., 270 energy use values and 270 corresponding outdoor temperature values). Thus, in some cases, various embodiments of the present invention use one year of data (e.g., a data set with 365 data points) to determine the non-climate control coefficient, cooling coefficient, and heating coefficient for the building. In other exemplary embodiments, the number of data points may vary based on the time interval used. For example, for monthly intervals, the calculation may rely on 24 months of data, while for daily readings, the calculation may rely on 270 days of data. In another example, for hourly readings, the calculation may rely on 2160 hours of data.

Once the non-climate control coefficient, cooling coefficient, and heating coefficient are determined, they are used to determine a climate control energy use and a non-climate control energy use 108. The climate control energy use and a non-climate control energy use can be determined from a set of equations. For example, the cooling energy use can be determined from equation 1 below.

$$\text{CoolingCoefficient} \times \Sigma\text{CoolingDegreeValues} = \text{CoolingEnergyUse} \qquad (1)$$

The equation requires summing the cooling degree values and then multiplying the sum by the cooling coefficient for the building. In the present example, the sum of the cooling degree values in Table III is 31 degrees. The sum of the cooling degrees multiplied by the cooling coefficient (1.274 kwh/degree) is the cooling energy use (39.5 kwh). Thus, in the present example, during the time period from June 1st to June 5th, the customer used 39.5 kwh to cool his building. Equation 2 below can be used to determine the heating energy use for the building.

$$\text{HeatingCoefficient} \times \Sigma\text{HeatingDegreeValues} = \text{HeatingEnergyUse} \qquad (2)$$

The sum of the heating degree values in Table III is 23 degrees. The sum of the heating degrees multiplied by the heating coefficient (1.984 kwh/degree) is the cooling energy use (45.6 kwh). Thus, in the present example, during the time period from May 27th to May 30th, the customer used 45.6 kwh to heat his building.

The climate control energy use for the time period can be determined using equation 3.

$$\text{HeatingEnergyUse} + \text{CoolingEnergyUse} = \text{ClimateControlEnergyUse} \qquad (3)$$

The heating energy use plus the cooling energy use is equal to the climate control energy use. In the present example, the climate control energy use is the cooling energy use of 39.5 kwh plus the heating energy use of 45.6 kwh. Thus, the climate control energy use is 85.1 kwh.

The non-climate control energy use can be calculated using equation 4.

$$\text{TimeIntervals} \times \text{Non-ClimateControlCoefficient} = \text{Non-ClimateControlEnergyUse} \qquad (4)$$

The non-climate control energy use is determined by multiplying the non-climate control coefficient by the number of time intervals in the time period. In the present example, there are ten days in the time period from May 27th to June 5th. Accordingly, the product of ten days and 24 kwh/day (the non-climate control coefficient) is 240 kwh. This means that, from May 27th to June 5th, the customer used 240 kwh for activities unrelated to cooling or heating his building, while using 85.1 kwh to cool and heat his building.

A normalizer value can be calculated using equation 5. The normalizer value is the predicted total usage of energy for the time period.

$$\text{HeatingEnergyUse} + \text{CoolingEnergyUse} + \text{Non-ClimateControlEneryUse} = \text{Normalizer} \qquad (5)$$

In the present example, the sum of the heating energy use (45.6 kwh), cooling energy use (39.5 kwh) and non-climate control energy use (240 kwh) is 325.1 kwh. This means that over the time period the customer used a predicted total of 325.1 kwh of energy.

The climate control energy use percentage can be calculated using the normalizer value (predicted total energy use) and climate control energy usages. Equations 6 and 7 can be used to determine the cooling and heating energy use percentages, respectively.

$$\frac{CoolingEnergyUse}{Normalizer} \times 100 = CoolingEnergyUsePercentage \qquad (6)$$

$$\frac{HeatingEnergyUse}{Normalizer} \times 100 = HeatingEnergyUsePercentage \qquad (7)$$

In the present example, the cooling energy use divided by the normalizer value equals a cooling energy percentage of 12.2%. In other words, 12.2% of the total energy use during the period from May 27th to June 5th was for cooling the building. With respect to heating energy use percentage, the heating energy use divided by the normalizer value equals a heating energy percentage of 14%. Therefore, 14% of the total energy use during the period from May 27th to June 5th was for heating the building.

In exemplary embodiments of the invention, the normalizer value is used to determine the climate control energy use percentage, but in other embodiments, the actual energy use for the period may also be used. For example, in the present example, the actual energy use is the sum of the energy use values in table I (e.g., 334 kwh).

Once the climate control energy use values and non-climate control energy use values are determined, they are then communicated to a customer that is associated with the building 210 (e.g., tenant, landlord, owner, or manager). For example, in some embodiments, a tenant of an apartment may receive a message via e-mail that reports his actual energy use, cooling energy use percentage, and heating energy use percentage. In another embodiment, a small commercial owner/operator may receive via regular mail a bill that indicates his actual energy use, cooling energy use, and heating energy use. In yet another embodiment, an owner of a household can log into a website and view his predicted total energy use and his climate control energy use for a particular time period. Each one of these embodiments provides a way of communicating climate control energy use and non-climate control energy to a customer. In exemplary embodiments of the present invention, the communication may also include a report of the customer's energy use as compared to another customer's energy use. Such reporting methods are disclosed in U.S. patent application Ser. No. 12/009,622 filed on Jan. 18, 2008 and U.S. patent application Ser. No. 12/009,639 filed on Jan. 18, 2008, both of which are hereby incorporated by reference in their entirety.

Figure 3:
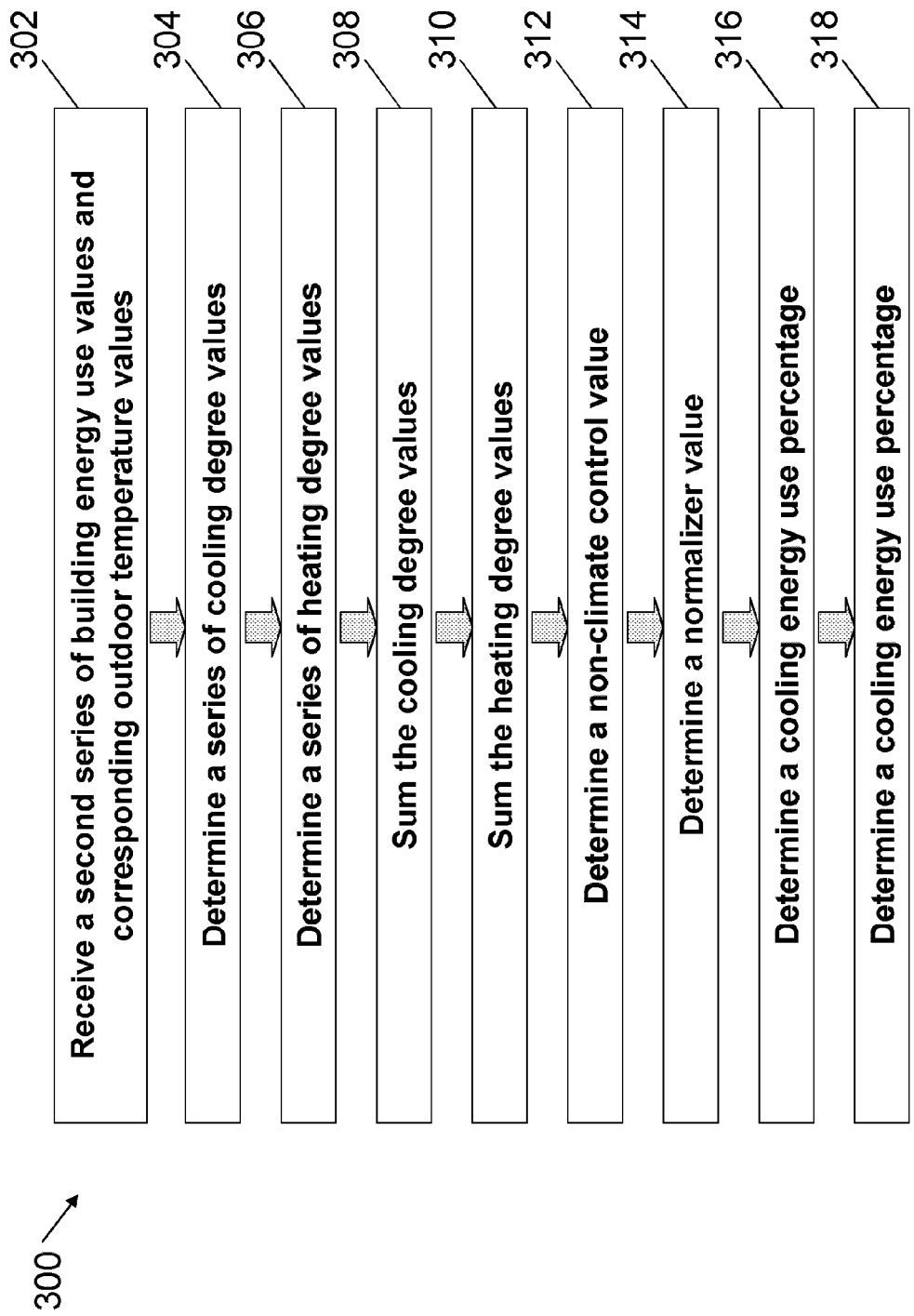
FIG. 3 shows a method for using a climate control coefficient and a non-climate control coefficient to determine climate control energy use and non-climate control energy use for a building, in accordance with one embodiment of the present invention.

In exemplary embodiments of the present invention, the climate control coefficient(s) and non-climate control coefficient, which are calculated using the first series of data, are also applied to determine climate control energy use for a second series of data. FIG. 3 shows a method for using the non-climate control coefficient and the climate control coefficient to determine climate control energy use and non-climate control energy use for the building 300. The method includes receiving a second series of building energy use values and corresponding outdoor temperature values for a second time period 302. Table VI shows an example of a second series of energy use values for a time period from July 1st to July 7th, while Table VII shows an example of the outdoor temperatures for the same time period.

EXEMPLARY TABLE VI

| Date | Energy Use Values |
| --- | --- |
| 7/1 | 29 kwh |
| 7/2 | 33 kwh |
| 7/3 | 26 kwh |
| 7/4 | 29 kwh |
| 7/5 | 25 kwh |
| 7/6 | 45 kwh |
| 7/7 | 22 kwh |

EXEMPLARY TABLE VII

| Date | Outdoor Temperature |
| --- | --- |
| 7/1 | 69° F. |
| 7/2 | 70° F. |
| 7/3 | 68° F. |
| 7/4 | 73° F. |
| 7/5 | 67° F. |
| 7/6 | 89° F. |
| 7/7 | 66° F. |

The method includes determining a series of cooling degree values for the time period based on a difference in temperature between the baseline temperature and each of the outdoor temperature values above the baseline temperature 304 and determining a series of heating degree values for the time period based on a difference in temperature between the baseline temperature and each of the outdoor temperature values below the baseline temperature 306.

Table VIII shows a series second of temperature difference values for the time period derived from the second series of outdoor temperatures (Table VII).

EXEMPLARY TABLE VIII

| Date | Cooling Degree Values | Heating Degree Values |
| --- | --- | --- |
| 7/1 | 4° F. | 0 |
| 7/2 | 5° F. | 0 |
| 7/3 | 4° F. | 0 |
| 7/4 | 3° F. | 0 |
| 7/5 | 2° F. | 0 |
| 7/6 | 14° F. | 0 |
| 7/7 | 1° F. | 0 |

In the present example, there are no outdoor temperatures that are below the baseline temperature (65° F.). Accordingly, there are no heating degree values. However, because each of the outdoor temperatures is above the baseline temperature, there are 7 cooling degree values. The cooling degree values are summed 308 resulting is a sum of 33 degrees. The heating degree values are also summed, but because there are no heating degree values, the sum is "0" 310.

A non-climate control value is determined by multiplying the previously determined non-climate control coefficient (24 kwh/day) by the number of time intervals in the time period 312. In the second series of outdoor temperatures, there are seven time intervals (e.g., days) in the time period. Thus, the non-climate control energy use value is 168 kwh. Next, in the present example, a normalizer value is determined according to equation 8.

$$(CoolingCoefficient \times \sum CoolingDegreedValues) + \\ (HeatingCoefficient \times \sum HeatingDegreeValues) + \\ NonClimateControlEnergyUse = \text{Normalizer} \quad (8)$$

The normalizer value is determined by adding three components: (1) the non-climate control value; (2) the product of the cooling coefficient and the cooling sum; and (3) the product of the heating coefficient and the heating sum value 314. Accordingly, in the present example, the sum of the cooling degrees (33 degrees) multiplied by the cooling coefficient (1.274 kwh/degree) is 42 kwh, the sum of the heating degrees (0 degrees) multiplied by the heating coefficient is 0 kwh, and the previously determined non-climate control energy use value is 168 kwh. The sum of these three values is 210 kwh.

The normalizer value is then used to determine the cooling energy use percentage and/or the heating energy use percentage for the building. The cooling energy use percentage is determined by dividing the product of the cooling coefficient and the cooling sum value (42 kwh) by the normalizer value (210 kwh) 316. In the present example, therefore, the cooling energy use percentage is 20%. The heating energy use percentage is determined by dividing the product of the heating coefficient and the heating sum value (0 kwh) by the normalizer value (210 kwh) 318. Accordingly, in this case, the heating energy use percentage is 0%. Once the percentages are calculated, they can be communicated to the customer 110 as shown in FIG. 1. For example, in exemplary embodiments, the method reports the cooling use percentage (20%) and the heating use percentage (0%). In some embodiments, the method also reports the actual energy use for the period by summing the values in Table IV. In this case the actual energy use for the period is 209 kwh. Then the actual energy use is multiplied by the percentages to determine the energy use values for cooling and heating (e.g., 20%*209=41.8 kwh for cooling and 0%*209=0 kwh for heating).

As energy use data and corresponding outdoor temperatures are received on a periodic basis (e.g., on a monthly basis), the climate control energy use and non-climate control energy is calculated using the previously determined heating, cooling, and non-climate control coefficients. However, in exemplary embodiments, the cooling, heating, and non-climate control coefficients are periodically recalculated (e.g., once every 12 months or once every 24 months). In some embodiments, the recalculation is done based on all previous energy usage and corresponding outdoor temperature data. Yet, in other embodiments, the recalculation is performed based on energy usage and corresponding outdoor temperature data from the last 9, 12, 18, or 24 months. The recalculation of coefficients helps the method account for any changes in the customer's non-climate control energy usage and any changes in the building's sensitivity to outdoor temperatures. For example, if the customer replaced the building's windows with advanced thermally insulating windows, the building's sensitivity to outdoor temperature would likely change. Also, over the course of several months, the customer may have changed his non-climate control energy usage (e.g., always turns the lights of when not at home). The recalculation of coefficients helps account for evolving building structure and customer habit.

Figure 4:
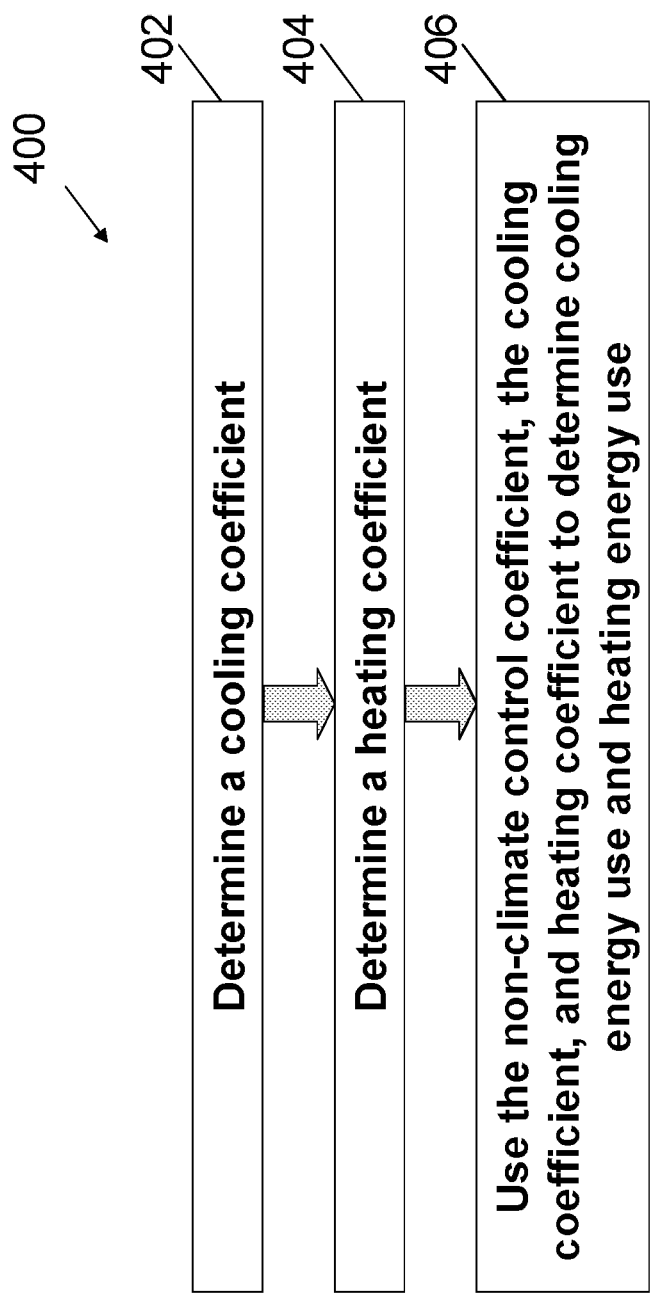
FIG. 4 shows a method for determining both heating and cooling energy use, in accordance with one embodiment of the present invention.
Figure 5:
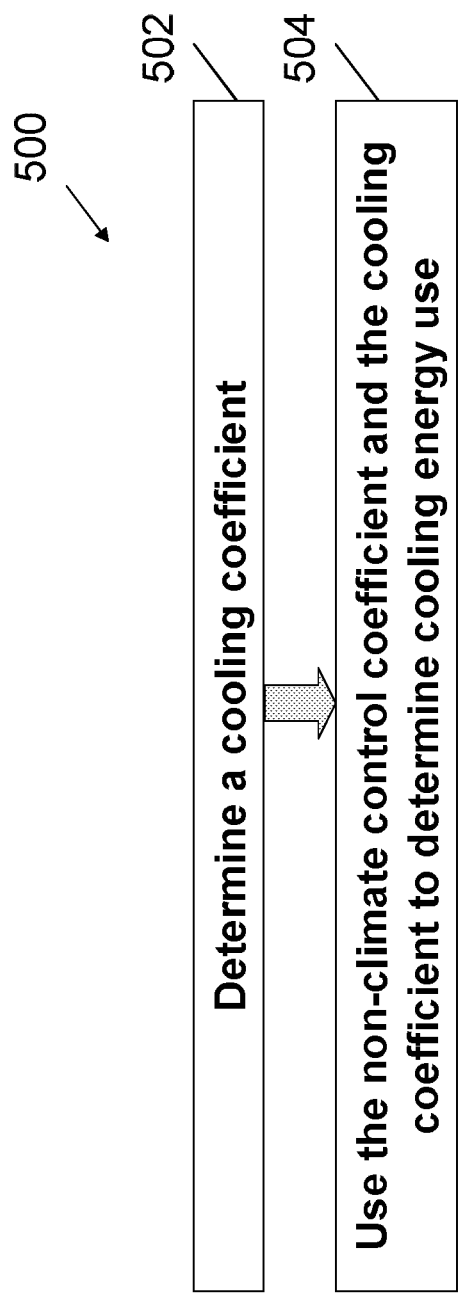
FIG. 5 shows a method for determining cooling energy use, in accordance with one embodiment of the present invention.
Figure 6:
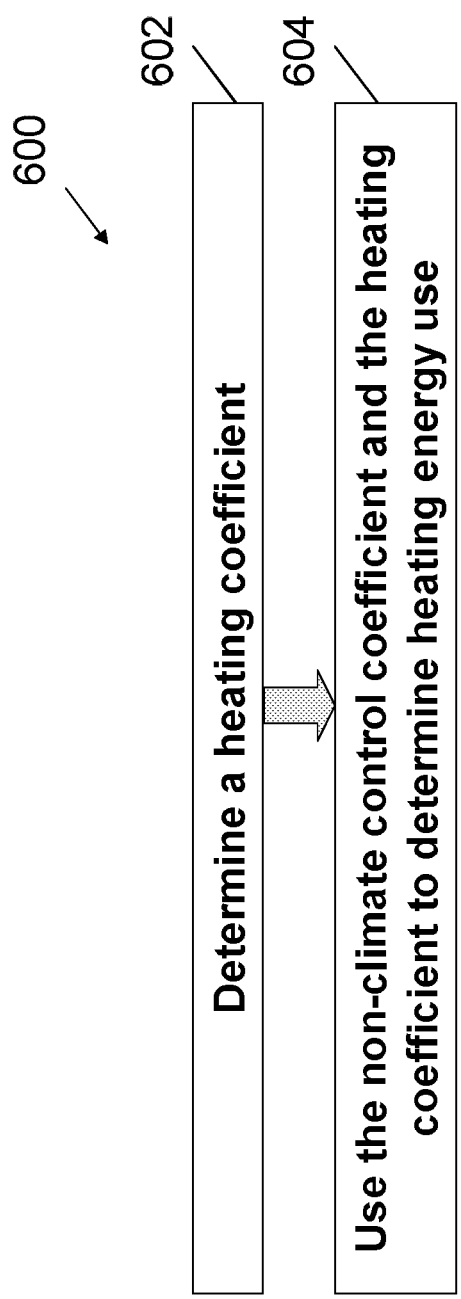
FIG. 6 shows a method for determining heating energy use, in accordance with one embodiment of the present invention.

In the present example, climate control energy use is determined for both heating and cooling as shown in FIG. 4. A cooling coefficient and a heating coefficient are determined 402, 404. Then, the coefficients are used to determine both cooling energy use and heating energy use 406. However, in other embodiments of the invention, the climate control energy use is determined for only cooling. FIG. 5 shows an example of a method 500 wherein a cooling coefficient is determined and cooling energy use is calculated based on the cooling coefficient 502, 504, but the heating coefficient and heating energy use are not determined. In another exemplary embodiment, the climate control energy use is determined for only heating. FIG. 6 shows an example of a method 600 wherein a heating coefficient is determined and heating energy use is calculated based on the heating coefficient 602, 604, but a cooling coefficient and cooling energy use are not determined.

Also, in the present example, climate control energy use and non-climate control energy use are calculated for only a single building, however, illustrative embodiments of the present invention are capable of calculating climate control energy use and non-climate control energy use for a plurality of buildings. In such an embodiment, the method includes receiving a series of building energy use values and corresponding outdoor temperature values for each one of the plurality of buildings. A cooling, heating, and non-climate control coefficient is calculated for each one of the buildings. As explained above, these coefficients are building specific. The coefficients are then used to calculate climate control energy use and non-climate control energy use for each of the plurality of buildings. Illustrative embodiments of the present invention advantageously provide climate control energy use and non-climate control energy use for most of the plurality of buildings (e.g., 90%, 95%, or 99%), whereas many prior art methods discard up to 30% of the buildings because their energy use does not conform with the prior art's applied methodology.

Furthermore, in the present example, energy use is calculated for electricity using kilowatt-hours, but in other embodiments, energy use is calculated for, among other things, natural gas using British Thermal Units (BTU), oil using gallons, or wood pellets using pounds. In yet another embodiment, energy use is calculated for a combination of electricity and natural gas. For households with both gas and electricity, the method performs a regression analysis separately for each fuel. In other words, the method determines climate control coefficients and non-climate control coefficients for each fuel. Each heating and/or cooling energy use value is also calculated separately for each fuel. Then, those heating and/or cooling energy use values are combined using a measure of energy usage that is common to the fuels. In the case of natural gas and electricity, the measure might be British Thermal Units.

Table IX below provides an example of a building with cooling, heating, and non-climate control coefficients for both electricity and natural gas.

EXEMPLARY TABLE IX

|  | Electricity (kwh) | Natural gas (therms) |
| --- | --- | --- |
| Non-climate control coefficient | 18 | 0.37 |
| Cooling coefficient | 2 | 0 |
| Heating coefficient | 0.5 | 0.175 |

If, over a five day period, the building was exposed to a sum of 38 heating degree values and 0 cooling degree values, then, according to equations 2, 3, 4, and 5, normalizer values, heating energy use values, and cooling energy use values can be determined for each fuel:

The electricity normalizer value is 109 kwh (e.g., 5 days*18 kwh/day+38 degrees*0.5 kwh/degree)

The gas normalizer value is 8.5 therms (e.g., 5 days*0.37 therms/day+38 degrees*0.175 therms/degree)

The electricity used for heating is 19 kwh (e.g., 38 degrees*0.175 kwh/degree)

The gas used for heating is 6.65 therms (e.g., 38 degrees*0.37 therms/degree)

In the present example, the gas energy is converted to electrical energy using a conversion factor that is common to natural gas and electricity, such as British Thermal Units (BTU) (e.g., 1 therm=100000 BTU, 1 kwh=3413 BTU, thus 1 therm=29.3 kwh). Using such a conversion factor results in the following combined energy use values:

The combined normalizer value is 358.05 kwh (e.g., 109 kwh+8.5 therms*29.3 kwh/therm)

The combined energy used for heating is 213.8 kwh (e.g., 19 kwh+6.65 therms*29.3 kwh/therm)

Therefore, the percentage of combined energy use for heating in the time period according to equation 7 is 59.7% (e.g., 213.8 kwh/358.05 kwh).

In the present example, the conversion is done using a conversion factor that is common to both fuels (BTUs), however, in other embodiments, this conversion factor can be modified based on a weighing factor. For example, the conversion factor can be modified using the price of electricity in relation to the price of natural gas. In another embodiment, the factor can be modified using the amount of electricity usage in relation to the amount of natural gas usage for the building. In yet another embodiment, the conversion factor is determined using a combination of some or all of the weighing factors.

Figure 7:
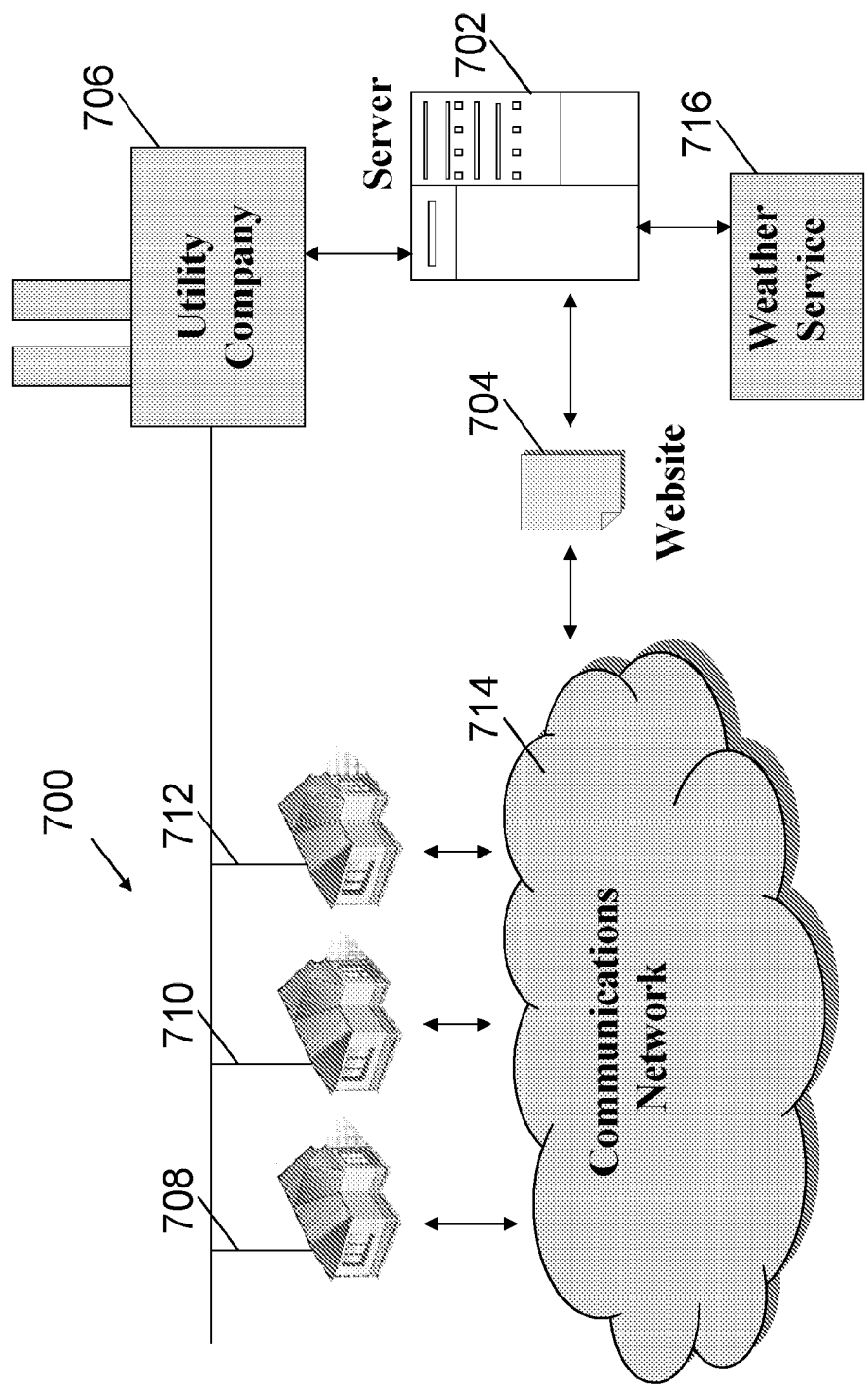
FIG. 7 shows a system for disaggregating climate control energy use from non-climate control energy, in accordance with one embodiment of the present invention.

FIG. 7 shows a system 700 for disaggregating climate control energy use from non-climate control energy, in accordance with one embodiment of the present invention. The system 700 includes a server 702 that, in some embodiments, supports a website 704. The server is in communication with a utility company 706. The utility company 706 provides electricity or gas to a plurality of buildings 708, 710, and 712. The utility company 706 tracks each building's energy use with a metering system. These building energy use values are received by the server 702 from the utility company 706. The building energy use values can be received by the server 702 via a communications network 714 (e.g., internet) as, for example, e-mails, downloaded FTP files, XML feeds, or metering feeds. However, in other embodiments, the global communications network is not used. Instead, the energy use values are sent by, for example, regular mail.

The server 702 is also in communication with a weather service 716, such as the National Weather Service. The server 102 receives corresponding outdoor temperatures from the weather service 716 via the communications network 714 (e.g., e-mails, downloaded FTP files, and XML feeds). However, in other embodiments, the corresponding outdoor temperatures may be received by regular mail. The server 702 then matches the building energy use values to the corresponding outdoor temperatures. For example, if one of the buildings is a household located in Portland, Me., then the server 702 will receive daily outdoor temperatures for Portland, Me. and match those outdoor temperatures to the household energy use values.

Using building energy use values and their corresponding outdoor temperatures, the server 702 calculates the climate control energy use and non-climate control energy use for each of the plurality of buildings 708, 710, and 712. The server 702 then communicates the energy use values to customers associated with those buildings 708, 710, and 712. In various embodiments of the present invention, the server 102 communicates the energy use values via the communications network 714. For example, the server 702 may send the energy use values in an e-mail or, in another embodiment, the customer may log into the server supported website 704 and view his disaggregated climate control energy. In additional or alternative embodiments, the server 702 itself prints the energy use data or provides the information to a printing system so that the data can be provided to the customer via regular mail (e.g., as part of a utility bill). In other embodiments, the energy use data is communicated back to the utility company 706 so that the utility company can provide the data to the customer.

In exemplary embodiments of the invention, the server 702 includes a processor that is programmed with any one or more of the following software modules:

- A utility communication module for receiving energy use data.
- A weather communication module for receiving corresponding outdoor temperature data.
- A matching module for matching energy use data to corresponding outdoor temperatures.
- A subtraction module for determining a series of temperature difference values.
- A regression module for calculating climate control coefficients and non-climate control coefficients.
- A disaggregation module for calculating climate control energy use data and non-climate control energy use data.
- A storage module for storing customer and building information (e.g., cooling coefficient, heating coefficient, non-climate control coefficient, energy use data, square feet, number of bedrooms, e-mail, and address).
- A website module for supporting the website.
- A customer communication module for communicating climate control energy use data and non-climate control energy use data to the customers via, for example, the website or e-mail.
- A printing module for printing climate control energy use data and non-climate control energy use data to be sent to customers via regular mail.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computerized-method for disaggregating climate control energy use from non-climate control energy use for a building, the method comprising:
    receiving a series of building energy use values and corresponding outdoor temperature values for a time period, wherein each of the energy use values and outdoor temperature values is associated with a time interval;
    in a computer process, determining a series of temperature difference values for the time period based on a difference in temperature between a predetermined baseline temperature and each of the outdoor temperature values;
    in a computer process, using a regression analysis to determine at least one of a climate control coefficient and a non-climate control coefficient from the energy use values and temperature difference values;
    in a computer process, using the climate control coefficient and the non-climate control coefficient to determine climate control energy use and non-climate control energy use for the building; and
    causing communicating of at least one of the climate control energy use and non-climate control energy use for the building to an associated customer.

2. A method according to claim 1, wherein determining a climate control coefficient comprises:
    determining a cooling coefficient based on the energy use values that are associated with outdoor temperature values above the predetermined baseline temperature; and
    wherein determining climate control energy use for the building comprises:
    using the non-climate control coefficient and the cooling coefficient to determine cooling energy use for the building.

3. A method according to claim 2, wherein determining cooling energy use for the building includes:
    receiving a second series of building energy use values and corresponding outdoor temperature values for a second time period, wherein each of the energy use values and outdoor temperature values is associated with a time interval;
    in a computer process, determining a series of cooling degree values for the time period based on a difference in temperature between the predetermined baseline temperature and each of the outdoor temperature values above the predetermined baseline temperature;
    in a computer process, summing the cooling degree values for the second time period to determine a cooling sum value;
    in a computer process, multiplying the non-climate control coefficient by the number of time intervals in the second time period to determine a non-climate control value;
    in a computer process, summing the non-climate control value and the product of the cooling coefficient and the cooling sum value to determine a normalizer value; and
    in a computer process, dividing the product of the cooling coefficient and the cooling sum value by the normalizer value to determine a cooling energy use percentage for the building.

4. A method according to claim 1, wherein determining a climate control coefficient comprises:
    determining a heating coefficient based on the energy use values that are associated with outdoor temperature values below the predetermined baseline temperature; and
    wherein determining climate control energy use for the building comprises:
    using the non-climate control coefficient and the heating coefficient to determine heating energy use for the building.

5. A method according to claim 4, wherein determining heating energy use for the building includes:
    receiving a second series of building energy use values and corresponding outdoor temperature values for a second time period, wherein each of the energy use values and outdoor temperature values is associated with a time interval;
    in a computer process, determining a series of heating degree values for the time period based on a difference in temperature between the predetermined baseline temperature and each of the outdoor temperature values below the predetermined baseline temperature;
    in a computer process, summing the heating degree values for the second time period to determine a heating sum value;
    in a computer process, multiplying the non-climate control coefficient by the number of time intervals in the second time period to determine a non-climate control value;
    in a computer process, summing the non-climate control value and the product of the heating coefficient and the heating sum value to determine a normalizer value; and in a computer process, dividing the product of the heating coefficient and the heating sum value by the normalizer value to determine a heating energy use percentage for the building.

6. A method according to claim 1, wherein determining a climate control coefficient comprises:
determining a cooling coefficient based on the energy use values that are associated with outdoor temperature values above the predetermined baseline temperature;
determining a heating coefficient based on the energy use values that are associated with outdoor temperature values below the predetermined baseline temperature; and
wherein determining climate control energy use for the building comprises:
using the non-climate control coefficient, the cooling coefficient, and the heating coefficient to determine cooling energy use and heating energy use for the building.

7. A method according to claim 6, wherein determining cooling energy use and heating energy use for the building includes:
receiving a second series of building energy use values and corresponding outdoor temperature values for a second time period, wherein each of the energy use values and outdoor temperature values is associated with a time interval;
in a computer process, determining a series of cooling degree values for the time period based on a difference in temperature between the predetermined baseline temperature and each of the outdoor temperature values above the predetermined baseline temperature;
in a computer process, determining a series of heating degree values for the time period based on a difference in temperature between the predetermined baseline temperature and each of the outdoor temperature values below the predetermined baseline temperature;
in a computer process, summing the cooling degree values for the second time period to determine a cooling sum value;
in a computer process, summing the heating degree values for the second time period to determine a heating sum value;
in a computer process, multiplying the non-climate control coefficient by the number of time intervals in the second time period to determine a non-climate control value;
in a computer process, summing the non-climate control value, the product of the cooling coefficient and the cooling sum value, and the product of the heating coefficient and the heating sum value to determine a normalizer value;
in a computer process, dividing the product of the cooling coefficient and the cooling sum value by the normalizer value to determine a cooling energy use percentage for the building; and
in a computer process, dividing the product of the heating coefficient and the heating sum value by the normalizer value to determine a heating energy use percentage for the building.

8. A method according to claim 1, wherein the predetermined baseline temperature has a value between 55° F. and 75° F.

9. A method according to claim 8, wherein the predetermined baseline temperature is 65° F.

10. A method according to claim 1, wherein the regression analysis is an ordinary least squares regression analysis.

11. A method according to claim 1, wherein the time interval is selected from the group consisting of one hour, one day, and one month.

12. A method according to claim 1, wherein the time interval is one day and the series of building energy use values and outdoor temperature values for the time period, includes at least 270 energy use values and 270 corresponding outdoor temperature values.

13. A method according to claim 1, wherein the building energy use values include both electricity and natural gas energy use values.

14. A method according to claim 1, further comprising:
receiving, for each one of a plurality of buildings, a series of building energy use values and corresponding outdoor temperature values for a time period, wherein each of the energy use values and outdoor temperature values is associated with a time interval;
in a computer process, for each one of the plurality of buildings, determining a series of climate control values for the time period based on a difference in temperature between a predetermined baseline temperature and each of the outdoor temperature values;
in a computer process, using, for each one of the plurality of buildings, a regression analysis to determine a non-climate control coefficient and a climate control coefficient from the energy use values and climate control values; and
in a computer process, using the non-climate control coefficient for each building and the climate control coefficient for each building to determine climate control energy use for each of the plurality of buildings.

15. A system for disaggregating climate control energy use from non-climate control energy use for a building, comprising:
a processor; and
a memory storing instructions executable by the processor to perform processes that include:
receiving a series of building energy use values and corresponding outdoor temperature values for a time period, wherein each of the energy use values and outdoor temperature values is associated with a time interval;
determining a series of temperature difference values for the time period based on a difference in temperature between a predetermined baseline temperature and each of the outdoor temperature values;
using a regression analysis to determine at least one of a climate control coefficient and a non-climate control coefficient from the energy use values and temperature difference values;
using the at least one of the climate control coefficient and the non-climate control coefficient to determine at least one of climate control energy use and non-climate control energy use for the building; and
causing communicating of the at least one of the climate control energy use and non-climate control energy use for the building to an associated customer.

16. A system according to claim 15, wherein determining a climate control coefficient comprises:
determining a cooling coefficient based on the energy use values that are associated with outdoor temperature values above the predetermined baseline temperature; and
wherein determining climate control energy use for the building comprises:
using the non-climate control coefficient and the cooling coefficient to determine cooling energy use for the building.

17. A system according to claim 16, wherein determining cooling energy use for the building includes:

receiving a second series of building energy use values and corresponding outdoor temperature values for a second time period, wherein each of the energy use values and outdoor temperature values is associated with a time interval;

determining a series of cooling degree values for the time period based on a difference in temperature between the predetermined baseline temperature and each of the outdoor temperature values above the predetermined baseline temperature;

summing the cooling degree values for the second time period to determine a cooling sum value;

multiplying the non-climate control coefficient by the number of time intervals in the second time period to determine a non-climate control value;

summing the non-climate control value and the product of the cooling coefficient and the cooling sum value to determine a normalizer value; and dividing the product of the cooling coefficient and the cooling sum value by the normalizer value to determine a cooling energy use percentage for the building.

18. A system according to claim 15, wherein determining a climate control coefficient comprises:

determining a heating coefficient based on the energy use values that are associated with outdoor temperature values below the predetermined baseline temperature; and wherein determining climate control energy use for the building comprises:

using the non-climate control coefficient and the heating coefficient to determine heating energy use for the building.

19. A system according to claim 18, wherein determining heating energy use for the building includes:

receiving a second series of building energy use values and corresponding outdoor temperature values for a second time period, wherein each of the energy use values and outdoor temperature values is associated with a time interval;

determining a series of heating degree values for the time period based on a difference in temperature between the predetermined baseline temperature and each of the outdoor temperature values below the predetermined baseline temperature;

summing the heating degree values for the second time period to determine a heating sum value;

multiplying the non-climate control coefficient by the number of time intervals in the second time period to determine a non-climate control value;

summing the non-climate control value and the product of the heating coefficient and the heating sum value to determine a normalizer value; and dividing the product of the heating coefficient and the heating sum value by the normalizer value to determine a heating energy use percentage for the building.

20. A system according to claim 15, wherein determining a climate control coefficient comprises:

determining a cooling coefficient based on the energy use values that are associated with outdoor temperature values above the predetermined baseline temperature;

determining a heating coefficient based on the energy use values that are associated with outdoor temperature values below the predetermined baseline temperature; and wherein determining climate control energy use for the building comprises:

using the non-climate control coefficient, the cooling coefficient, and the heating coefficient to determine cooling energy use and heating energy use for the building.

21. A system according to claim 20, wherein determining cooling energy use and heating energy use for the building includes:

receiving a second series of building energy use values and corresponding outdoor temperature values for a second time period, wherein each of the energy use values and outdoor temperature values is associated with a time interval;

determining a series of cooling degree values for the time period based on a difference in temperature between the predetermined baseline temperature and each of the outdoor temperature values above the predetermined baseline temperature;

determining a series of heating degree values for the time period based on a difference in temperature between the predetermined baseline temperature and each of the outdoor temperature values below the predetermined baseline temperature;

summing the cooling degree values for the second time period to determine a cooling sum value;

summing the heating degree values for the second time period to determine a heating sum value;

multiplying the non-climate control coefficient by the number of time intervals in the second time period to determine a non-climate control value;

summing the non-climate control value, the product of the cooling coefficient and the cooling sum value, and the product of the heating coefficient and the heating sum value to determine a normalizer value;

dividing the product of the cooling coefficient and the cooling sum value by the normalizer value to determine a cooling energy use percentage for the building; and dividing the product of the heating coefficient and the heating sum value by the normalizer value to determine a heating energy use percentage for the building.

22. At least one non-transitory computer readable medium encoded with instructions which when loaded on at least one computer, establish processes for disaggregating climate control energy use from non-climate control energy use for a building, the processes including:

receiving a series of building energy use values and corresponding outdoor temperature values for a time period, wherein each of the energy use values and outdoor temperature values is associated with a time interval;

determining a series of temperature difference values for the time period based on a difference in temperature between a predetermined baseline temperature and each of the outdoor temperature values;

using a regression analysis to determine at least one of a climate control coefficient and a non-climate control coefficient from the energy use values and temperature difference values;

using the at least one of the climate control coefficient and the non-climate control coefficient to determine at least one of climate control energy use and non-climate control energy use for the building; and causing communicating of the at least one of the climate control energy use and non-climate control energy use for the building to an associated customer.

* * * * *